United States Patent
Gangai (10) Patent No.: US 8,755,063 B2
(45) Date of Patent: *Jun. 17, 2014

(54) SYSTEM AND METHOD FOR TRANSFERRING A PORTION OF A DOCUMENT PRINT SEQUENCE OUTPUT BY A PRINT JOB SOURCE TO AN AUTOMATED DATA PROCESSING SYSTEM

(71) Applicant: Bottomline Technologies (DE) Inc., Portsmouth, NH (US)

(72) Inventor: Daniel P. Gangai, Winchester (GB)

(73) Assignee: Bottomline Technologies (DE) Inc., Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,194

(22) Filed: Jun. 17, 2013

(65) Prior Publication Data

US 2013/0293927 A1 Nov. 7, 2013

Related U.S. Application Data

(63) Continuation of application No. 11/821,034, filed on Jun. 21, 2007, now Pat. No. 8,482,745.

(60) Provisional application No. 60/923,816, filed on Apr. 16, 2007.

(51) Int. Cl.
*G06F 3/12* (2006.01)
*G06F 3/00* (2006.01)

(52) U.S. Cl.
USPC ............... 358/1.13; 358/1.15; 710/8; 710/19

(58) Field of Classification Search
None
See application file for complete search history.

(56) References Cited

U.S. PATENT DOCUMENTS

| | | | |
|---|---|---|---|
| 5,287,194 A | 2/1994 | Lobiondo | |
| 6,856,413 B1 * | 2/2005 | Roosen et al. | 358/1.15 |
| 6,958,824 B2 | 10/2005 | Whitmarsh | |
| 6,978,299 B1 | 12/2005 | Lodwick | |
| 6,992,782 B1 | 1/2006 | Yardumian | |
| 7,003,489 B1 | 2/2006 | Dixon | |
| 7,213,060 B2 | 5/2007 | Kemp | |
| 2003/0184787 A1 * | 10/2003 | Kuroda et al. | 358/1.13 |
| 2005/0007614 A1 * | 1/2005 | Kishigami | 358/1.13 |
| 2005/0024677 A1 * | 2/2005 | Miura et al. | 358/1.15 |
| 2007/0236717 A1 | 10/2007 | Nishikawa | |

* cited by examiner

*Primary Examiner* — Vincent Rudolph
(74) *Attorney, Agent, or Firm* — Renner, Otto, Boisselle & Sklar, LLP (57) ABSTRACT

A print processor interfaces with a print job source such as an accounting system and a remote automated data processing system. The print processor comprises a print job source interface for receiving a sequence of documents from a print job source. The sequence of documents may comprise a first set of documents and a second set of documents. The first set of documents and the second set of documents may be mutually exclusive subsets of the sequence of documents. Each document of the first set may comprise data content to be directed to the remote automated data processing system. Each document of the second set may be directed to a printer. The print processor may establish a network session to the remote automated data processing system, authenticating to the remote automated data processing system, and transfer each document of the first set to the remote automated data processing system. The print processor may direct transfer of the second set to the printer.

12 Claims, 8 Drawing Sheets

SYSTEM AND METHOD FOR TRANSFERRING A PORTION OF A DOCUMENT PRINT SEQUENCE OUTPUT BY A PRINT JOB SOURCE TO AN AUTOMATED DATA PROCESSING SYSTEM

TECHNICAL FIELD

The present invention relates to a print processor component, and more particularly, to a print processor component that accepts a document print sequence from a print job source and routes a first certain portion of the document(s) to an automated data processing system while routing a second certain portion to a printer.

BACKGROUND OF THE INVENTION

Typically a business will have an accounting software system that maintains a database of the business transactions with its customer, vendors, banks, and other third parties associated with the business as well as internal business transactions between internal accounts.

While these accounting systems facilitate record keeping and may reduce data entry for internal transactions, transactions between business have traditionally been handled by one businesses software system printing a document and the other business manually entering the transaction into their system using data from the document.

Figure 1:
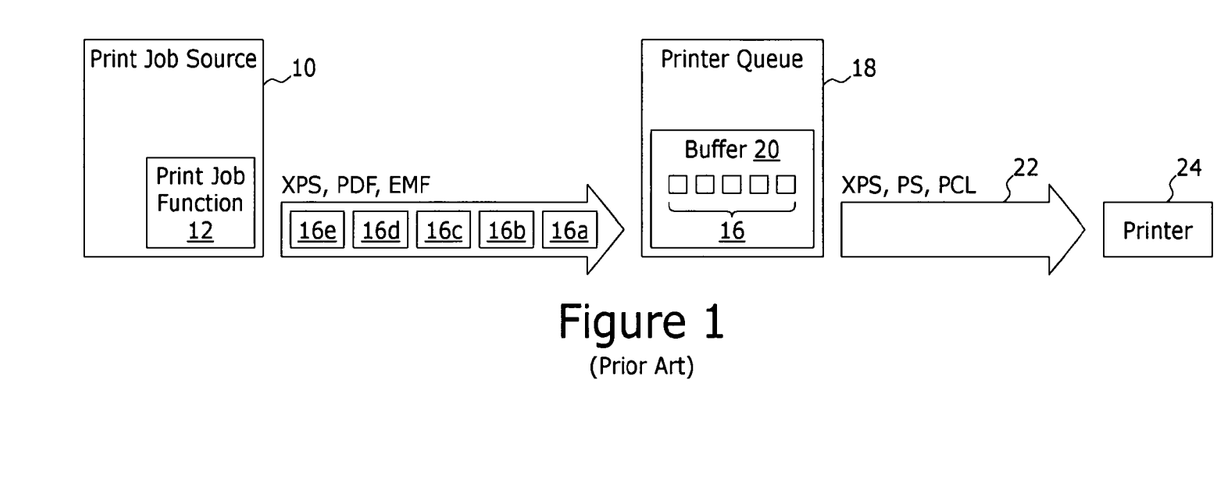
FIG. 1 is a block diagram representing known technology for printing a sequence of documents generated by a print job source.

For example, referring briefly to FIG. 1, an accounting software system 10 may include a print job function 12. For purposes of printing invoices for distribution to customers, a user of the system 10 may select the print job function 12 for a group of invoices. In a known manner such user would then select an appropriate printer queue 18 from a printer folder managed by the operating system. The print job function 12 would then generate a sequence of documents 16a-16e and direct such sequence of documents 16a-16e to the identified driver/spooler 18 via an interface therewith.

The format of each document (e.g. each page) of each invoice 16a-16e may be the native output of the system 10 such as Portable Document Format (PDF), Enhanced Metafile (EMF), XML Paper Specification (XPS), or other paper/printer description language.

The printer queue 18 receives the sequence of documents 16a-16e, converts the document format to a printer description language applicable to the printer 24 to which the job it to be sent (e.g. XPS, Post Script, Printer Control Language, etc), and stores each page in a buffer 20 for sending to the printer 24.

After printing, the invoices are stuffed into envelopes for mailing to the appropriate customer. The customer, upon receipt of the invoice, will likely enter invoice data through a manual data entry (MDE) screen provided by its accounting systems.

Recently various technologies have been developed to facilitate electronic exchange of transaction documents between trading partners. A problem exists in that a business is likely to have a group of trading partners which it may exchange documents electronically. The remainder of its trading partners will still use traditional paper based document exchange systems.

Further yet, the groups are dynamically changing over time. First, a business's trading partners change over as new customer/supplier relationships are established and some existing relationships are terminated. Secondly, customers and/or suppliers that have traditionally used paper based document exchange system may adopt electronic document exchange technologies.

Therefore, entering into electronic document exchange creates multiple challenges. First, adoption of an electronic document exchange technology which may require costly upgrades to existing paper based document exchange systems. Secondly, a paper based document exchange option must be maintained for those trading partners that still utilize paper based systems. And thirdly, the business must have system for efficiently distinguishing which trading partners utilize each system in an environment where new trading relationships are being established and trading partner's that have traditionally used paper based systems are adopting electronic document exchange technologies.

Accordingly there is a need in the art for a system and method for facilitating use of electronic document exchange without requiring significant modification or upgrading of paper based document exchange systems. Further, there is a need in the art for a system and method for facilitating use of electronic document exchange in an environment wherein only a portion of a business's documents are exchanged electronically while the remaining portion are exchanged utilizing paper based document exchange systems. Further yet, there is a need in the art for a system and method for facilitating electronic document exchange in an environment wherein new trading relationships are being established and trading partners, that have traditionally used paper based document exchange systems, are adopting electronic document exchange systems.

SUMMARY OF THE INVENTION

A first aspect of the present invention comprises a print processor for interfacing with a remote automated data processing system. The print processor comprises a print job source interface for receiving a sequence of documents from a print job source.

The sequence of documents comprise a first set of documents and a second set of documents. Each document of the first set of documents comprises data content to be directed to the remote automated data processing system. Each document of the second set of documents is to be directed to a local printer. The first set of documents and the second set of documents may be mutually exclusive subsets of the sequence of documents.

An automated data processing client: i) establishes a network session to the remote automated data processing system; ii) authenticates to the remote automated data processing system; and iii) transfers each document of the first set of documents to the remote automated data processing system. A printer interface directs each document of the second set of documents to the printer.

In one sub-embodiment, a document buffer stores the sequence of documents from the print job source. A print processor application: i) directs the transfer of the sequence of documents from the print job source to the automated data processing client for transfer to the remote automated data processing system; ii) receives, via the automated data processing client, identification of those documents within the sequence of documents from the print job source which are of the second set of documents; and iii) directs only the second set of documents from the document buffer to the printer interface.

The print processor application may further direct a group one summary document to the printer interface. The group one summary document may comprise an identification of each document of the first group that was transferred to the remote automated data processing system.

In a second sub-embodiment, a print processor application: i) assigns the document to the first set of documents if the text at a predetermined location within the document matches one of a plurality of group one recipient identification strings; ii) assigns the document to the second set of documents if the text at the predetermined location within the document does not match one of the plurality of group one recipient identification strings; iii) directs only the first set of documents to the automated data processing client for transfer to the remote automated data processing system; and iv) directs only the second set of documents from the document buffer to the printer interface.

Again, the print processor application may further direct a group one summary document to the printer interface. The group one summary document may comprise an identification of each document of the first group that was transferred to the remote automated data processing system.

In this second sub-embodiment, the print processor application may further obtain, from the remote automated data processing system: i) identification of the predetermined location; and ii) identification of the plurality of group one recipient identification strings.

A second aspect of the present invention comprises a print processor for transferring invoice data for only a portion of a sequence of invoice documents to a remote automated data processing system. The print processor comprises: i) a print job source interface for receiving the sequence of invoice documents from a print job source.

The sequence of invoice documents comprises a first set of documents and a second set of documents. Each document of the first set of documents comprises an invoice to a customer that is a member of a first group of customers. Each document of the second set of documents is to a customer that is not a member of the first group of customers (e.g. a customer that is a member of the second group of customers). The first set of invoice documents and the second set of documents may be mutually exclusive subsets of the sequence of invoice documents.

An automated data processing client: i) establishes a network session to the remote automated data processing system; ii) authenticates to the remote automated data processing system; and iii) transfers each invoice document of the first set to the remote automated data processing system. A printer interface directs each invoice document of the second set to the printer.

In one sub-embodiment, a document buffer stores the sequence of invoice documents from the print job source. A print processor application: i) directs the transfer of the sequence of invoice documents from the print job source to the automated data processing client for transfer to the remote automated data processing system; ii) receives, via the automated data processing client, identification of those documents within the sequence of documents from the print job source which are of the second set of documents; and iii) directs only the second set of documents from the document buffer to the printer interface.

The print processor application may further direct a group one summary document to the printer interface. The group one summary document may comprise an identification of each document of the first group that was transferred to the remote automated data processing system.

In a second sub-embodiment, a print processor application: i) assigns the invoice document to the first set of documents if invoice is to a customer that is a member of a first group of customers; ii) assigns the document to the second set of documents if the invoice is to a customer that is not a member of the first group of customers; iii) directs only the first set of documents to the automated data processing client for transfer to the remote automated data processing system; and iv) directs only the second set of documents from the document buffer to the printer interface.

Again, the print processor application may further direct a group one summary document to the printer interface. The group one summary document may comprise an identification of each document of the first group that was transferred to the remote automated data processing system.

In this second sub-embodiment, the print processor application may further obtain, from the remote automated data processing system: i) identification of means for identifying the customer associated with an invoice document; and ii) identification of a plurality of group one customers.

A third aspect of the present invention comprises a method of operating a system for transferring a first portion of a sequence of documents from a print job source to a remote automated data processing system and transferring a second portion of the sequence of documents to a printer. The first portion and the second portion may be mutually exclusive subsets of the sequence of documents.

The method comprises: i) receiving the sequence of documents from the print job source; ii) determining that a document is part of the first portion by identifying data content associated with the remote automated data processing system and the remainder of the documents being part of the second portion; iii) establishing a network session to the remote automated data processing system; iv) authenticating to the remote automated data processing system; v) transferring each document of the first portion to the remote automated data processing system; and vi) directing each document of the second portion to the printer.

In a first sub-embodiment, the method may further comprise storing the sequence of documents from the print job source and through the network session: i) directing the transfer of the sequence of documents from the print job source to the remote automated data processing system; and ii) receiving identification of those documents within the second portion from the remote automated data processing system. The method then includes directing only those documents of the second portion to the printer.

The method may further comprise generating a summary document identifying each document of the first portion and directing the summary document to the printer.

In a second sub-embodiment, the method may further comprise: i) identifying a document as part of the first portion if the text from a predetermined location within the document matches one of a plurality of group one recipient identification strings; ii) identifying a document as part of the second portion if the text from the predetermined location within the document does not match one of the plurality of group one recipient identification strings; iii) directing only the documents of the first portion to the remote automated data processing system; and iv) directing only the documents of the second portion to the printer.

Again, the method may further comprise generating a summary document identifying each document of the first portion and directing the summary document to the printer.

Further, in this second sub-embodiment, the method may further comprise obtaining, from the remote automated data processing system: i) identification of the predetermined location; and ii) identification of the plurality of group one recipient identification strings.

For a better understanding of the present invention, together with other and further aspects thereof, reference is made to the following description, taken in conjunction with the accompanying drawings. The scope of the invention is set forth in the appended claims.

DETAILED DESCRIPTION OF THE INVENTION

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

Figure 2:
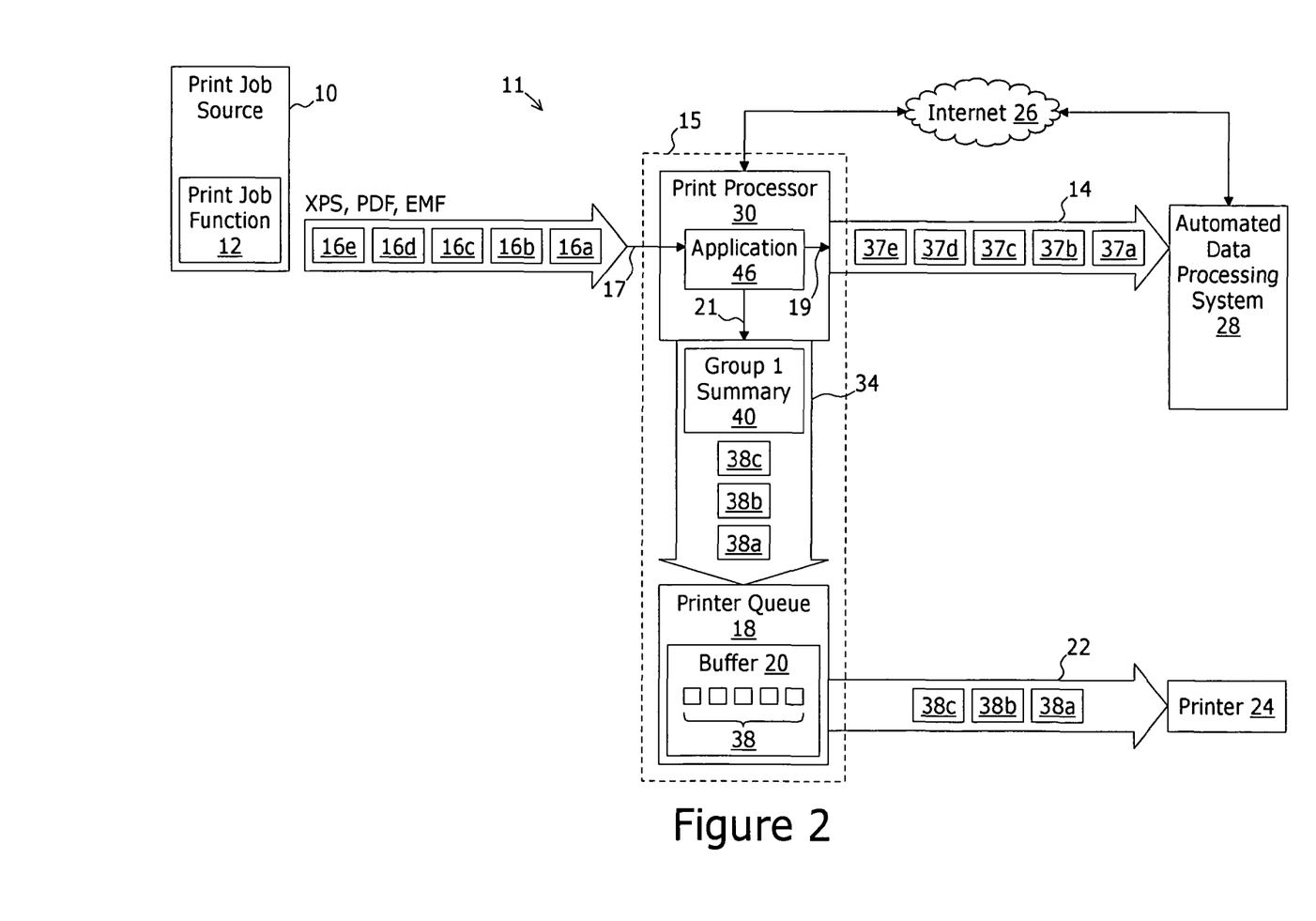
FIG. 2 is a block diagram representing architecture routing a first portion of a sequence of documents to an automated data processing system while routing a second portion to a printer in accordance with an embodiment of the present invention.

FIG. 2 illustrates exemplary architecture of a system 11 for transferring a first portion of a document output array from a system to an automated data processing system 28 in accordance with one embodiment of the present invention.

In the exemplary embodiment, a print job source 10 such as an accounting software system may be utilized in conjunction with a print processor 30, a traditional printer queue 18, a remote automated data processing system 28, and a traditional printer 24 in a manner such that a first set of documents 37a-37e of a sequence of documents 16a-16e is transferred to the remote automated data processing system 28 while a second set of documents 38a-38c of the sequence of documents 16a-16e is transferred to the traditional printer queue 18 and traditional printer 24.

The first set of documents 37a-37e and the second set of documents 38a-38c may be mutually exclusive. In more detail, each document of the first set of documents 37a-37e may comprise data content to be directed to the remote automated data processing system 28. Each document of the second set of documents 38a-38c may be for printing at the printer 24. For example, in an embodiment wherein the remote automated data processing system 28 includes systems for invoice processing, each document of the first set of documents 38a-38c may be an invoice (or a page of a multi page invoice) directed to a customer that utilizes the invoice processing services of the remote automated data processing system 28 while each document of the second set of documents 38a-38c may be an invoice (or a page of a multi page invoice) for a customer to which its invoices are to be printed and mailed in a traditional manner.

The accounting system print job source 10 may include a print job function 12 for generating the sequence of documents 16a-16e. If the print job source 10 is a server based accounting system, a user of a client system may select the print job function 12 for identifying the sequence of documents 16a-16e for printing and select an available printer from a printer folder 15.

The sequence of documents 16a-16e may include both the first set of documents 37a-37e and the second set of documents 38a-38c. (e.g. a superset of the mutually exclusive first set of documents 37a-37e and the second set of documents 38a-38c). Each document of the sequence of documents 16a-16e may be in any compatible format including, but not limited to, XPS, PDF, EMF.

The printer folder 15 may be a well known directory which includes the print drivers/spoolers (or includes shortcuts to the print drivers/spoolers) to which a user may send a print job. In the exemplary embodiment, the printer folder 15 includes both the print processor 30 and the printer queue 18.

The print processor 30 may comprise a print job source interface 17 for receiving the sequence of documents 16a-16e from the print job source 10 when the user accessing the print job function 12 selects the virtual printer driver 30 as the printer to which the sequence of documents 16a-16e is to be sent.

The print processor 30 may further include a print processor application function 46, an automated data processing client 19, and a printer interface 21. In general, the application function 46 receives the sequence of documents 16a-16e and, for each document, determines whether such document is part of the first set of documents 37a-37e or part of the second set of documents 38a-38c. The first set of documents 37a-37e are passed to the automated data processing client 19.

The automated data processing client 19 authenticates to, and establishes a network session 14 with the remote automated data processing system 28 and, through such network session 14, transfers the first set of documents 37a-37e.

In exemplary embodiments, the network session 14 may represent a TCP/IP connection established by the automated data processing client 19 to a web server the automated data processing system 28. Alternatively, the network session 14 may be a web services session utilizing SOAP messaging between the automated data processing client 19 and compatible systems of the automated data processing system 28.

The second set of documents 38a-38c are passed to the printer interface 21. The printer interface 21 includes an interface 34 to the traditional printer queue 18 for passing the second set of documents 38a-38c to the traditional printer queue 18 for printing on printer 24.

The traditional printer queue 18 may buffer each document of the second set of documents 38a-38c in a traditional manner, convert the format to a printer language compatible with the printer 24 in a traditional manner, and utilize a port 22 to the printer 24 in a traditional manner for passing each document of the second set of documents 38a-38c to the printer for printing.

Further, the application 46 may generate an additional document 40 which lists or summarizes those documents of the first set of documents 37a-37e and pass such additional document 40 to the printer interface 21. As such, after printing each document of the second set of documents 38a-38c, the additional document 40 (e.g. the summary of the first set of documents 37a-37e) may also be printed at the printer 24.

First Sub Embodiment

Figure 3:
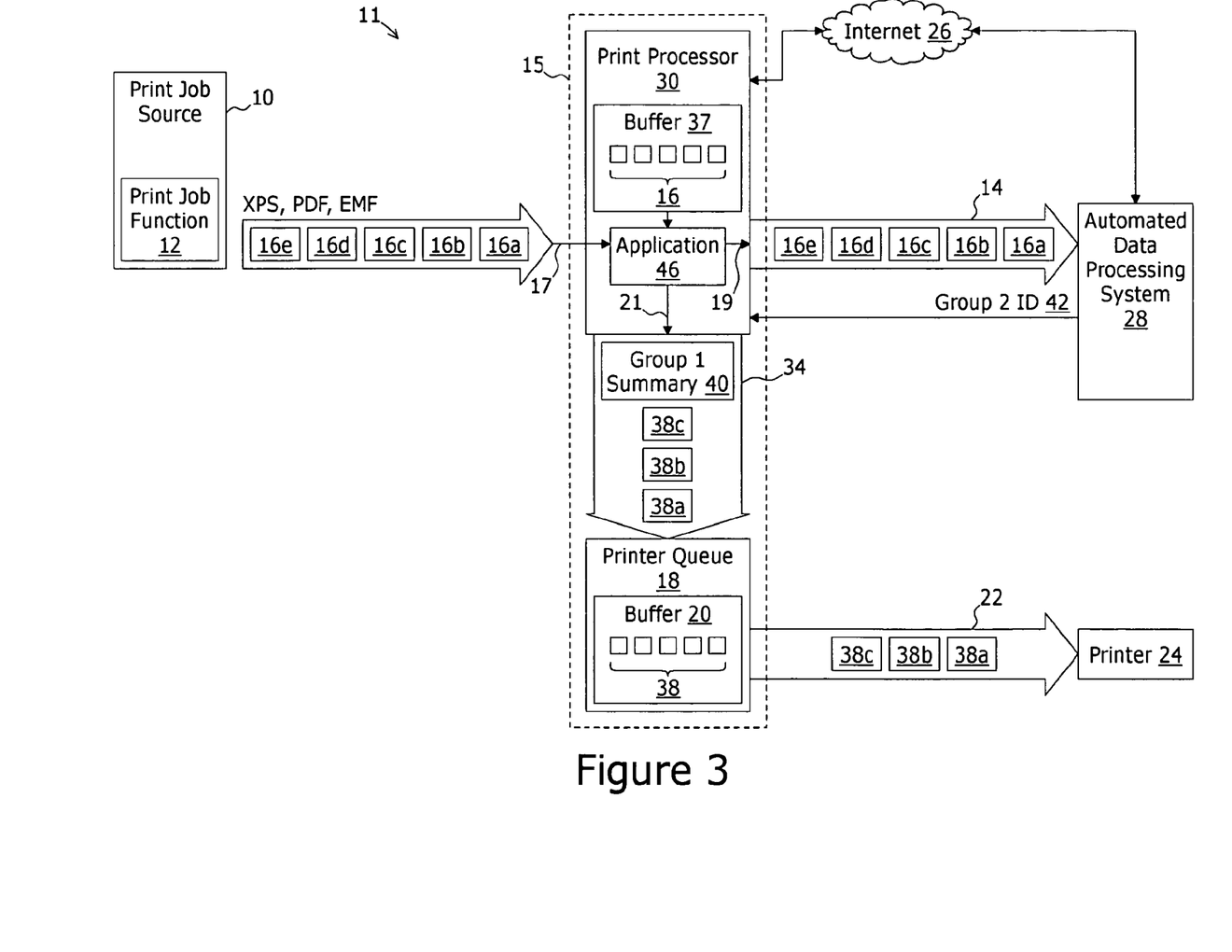
FIG. 3 is a block diagram representing a first sub embodiment of an architecture for routing a first portion of a sequence of documents to an automated data processing system while routing a second portion to a printer in accordance with an embodiment of the present invention.

The block diagram of FIG. 3 represents one sub embodiment of the print processor 30 and its operation in conjunction with the remote data processing system 28. The print processor 30 of this sub embodiment includes a document buffer 37 for temporarily storing each document of the sequence of documents 16a-16e. In general, the application 46 directs the transfer of the entire sequence of documents 16a-16e to the automated data processing system 28. The automated data processing system 28 returns a group 2 identification 42 which those documents, within the sequence of documents 16a-16e which comprise the second set of documents 38a-38c. The application then directs the second set of documents 38a-38c (as identified by the group 2 identification 42) from the document buffer 37 to the printer interface 21 for printing by printer 24. The documents in the document buffer 37 which are not identified as part of the second set of documents 38a-38c are decimated.

Figure 8:
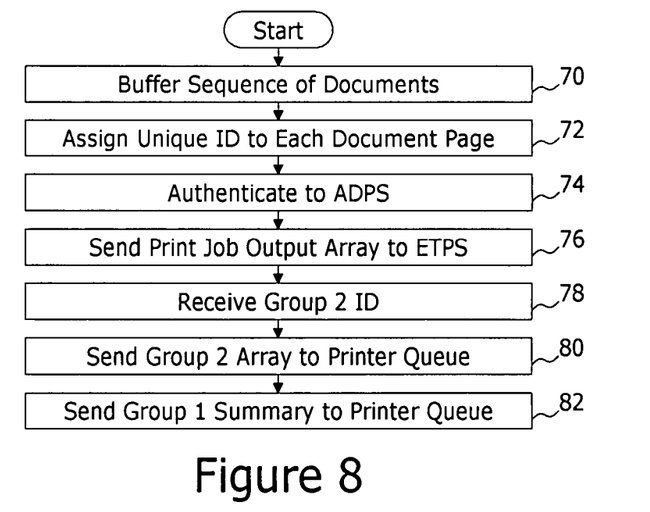
FIG. 8 is a flow chart representing an aspect of operation of a print processor in accordance with an embodiment of the present invention.

Turning to the flow chart of FIG. 8, in conjunction with FIG. 3, more detailed processing steps performed by the application 46 in support of this sub embodiment comprise buffering the sequence of documents 16a-16e received from the print job source 12 in the document buffer 37.

Step 72 represents assigning a unique identifier (such a document sequence number) to each document stored in the document buffer 37.

Step 74 represents directing the automated data processing client to to authenticate to, and establishing the secure network session 14 with the remote automated data processing system 28 over the Internet 26.

Step 76 represents directing the automated data processing client to transfer the entire sequence of documents 16a-16e to the automated data processing system through the secure network session 14.

Step 78 represents receiving the group 2 ID 42 from the remote automated data processing system 28. The group 2 ID 42 may include the unique identifier of each document that comprises the second set of documents 38a-38c, may be the unique identifier of each document that comprises the first set of documents 37a-37e, or other identifier that distinguishes which documents of the sequence of documents 16a-16e are part of the second set of documents 38a-38c.

Step 80 represents obtaining those documents identified as documents of the second set of documents 38a-38c from the document buffer 37 and transferring such second set of documents 38a-38c to the printer queue 18 by the printer interface 21.

Step 82 represents generating the additional document 40 comprising the summary of the first set of documents (e.g. those documents not identified as part of the second set of documents 38a-38c by the group 2 ID 42) and sending such additional document to the printer queue 18 for printing by the printer 24.

It should be appreciated that although the flow chart of FIG. 8 represents each step performed in a linear manner, for larger sequences of documents 16a-16e, all steps may be in process simultaneously. For example, the application 46 may commence the transfer of documents to the remote automated data processing system 28 while documents are still being received from the print job source 10. Further, signals representing the group 2 ID 42 may be received from the remote electronic transaction processing system 28 identifying documents of the second set 38a-38c while other documents of the sequence of documents 16a-16e are still being transferred to the remote automated data processing system 28. As such, the application 46 may also be directing documents of the second set of documents 38a-38c to the printer queue 18 while still receiving documents from the print job source and while still transferring documents to the automated data processing system 28. Such to simultaneous operation reduces the size of the document buffer 37 that would be required.

Second Sub Embodiment

Figure 4:
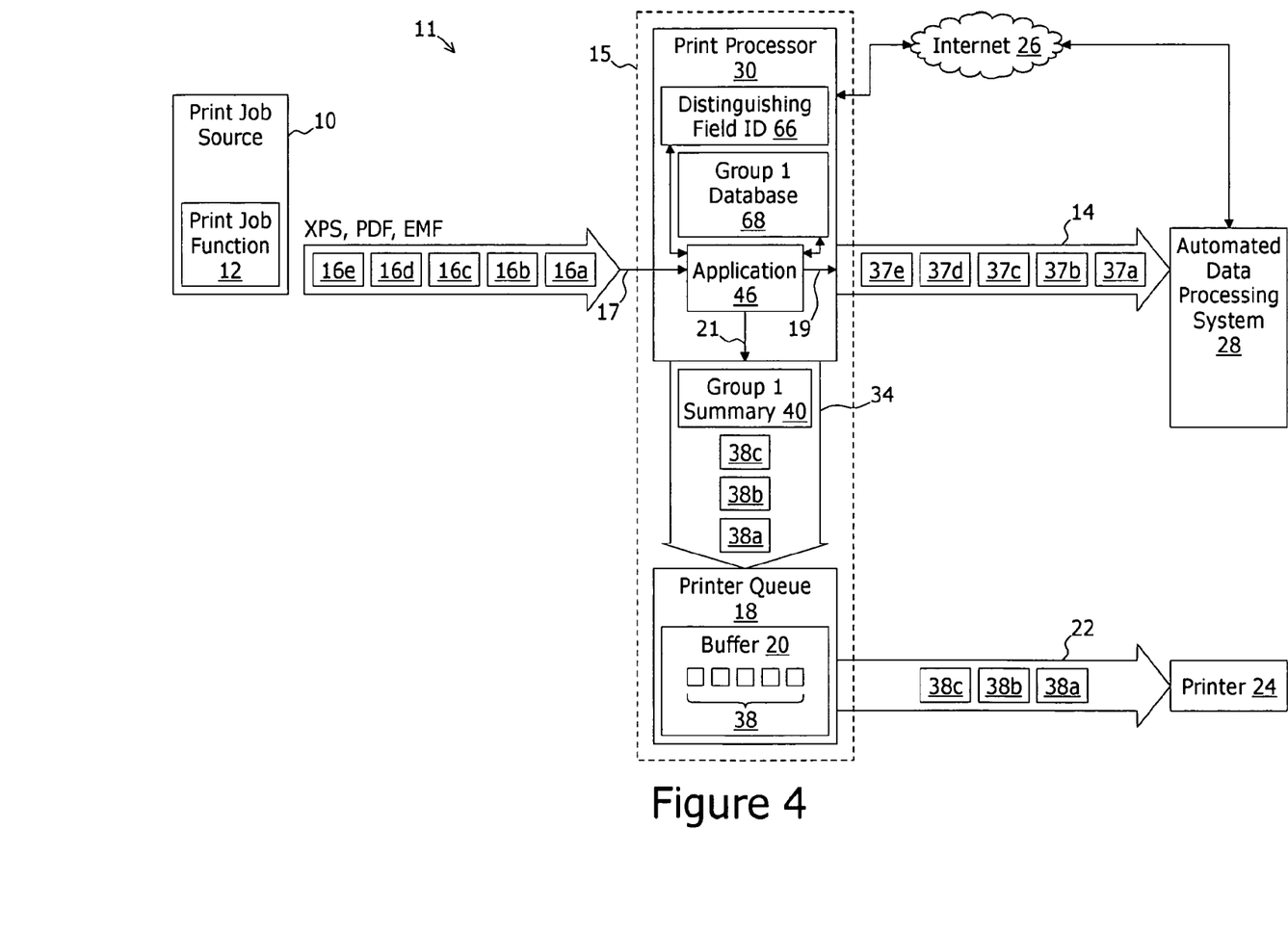
FIG. 4 is a block diagram representing a second sub embodiment of an architecture for routing a first portion of a sequence of documents to an automated data processing system while routing a second portion to a printer in accordance with an embodiment of the present invention.

The block diagram of FIG. 4 represents a second sub embodiment of print processor 30 and its operation in conjunction with the remote data processing system 28.

The print processor 30 of this sub embodiment includes a group 1 database 65 and a distinguishing field identifier 66.

The group 1 database 65 comprises a listing one or more characteristics for identifying whether a document 16a-16e is part of the first set of documents 37a-37e.

In the embodiment wherein the sequence of documents 16a-16e are invoices, the characteristic may be the company name of the customer to which the invoice is directed. As such, the listing of characteristics of the group 1 database 65 may be a listing of customers that utilize the automated data processing system 28 such that invoices directed to such customers are part of the first set of documents 37a-37e.

The distinguishing field identifier 66 comprises instructions to enable the application 46 to locate the characteristic in a document 16 that, if matched to the listing of characteristics in the group 1 database, results in a determination that such document is part of the first set of documents 37a-37e and is transferred to the automated data processing system.

Figure 5A:
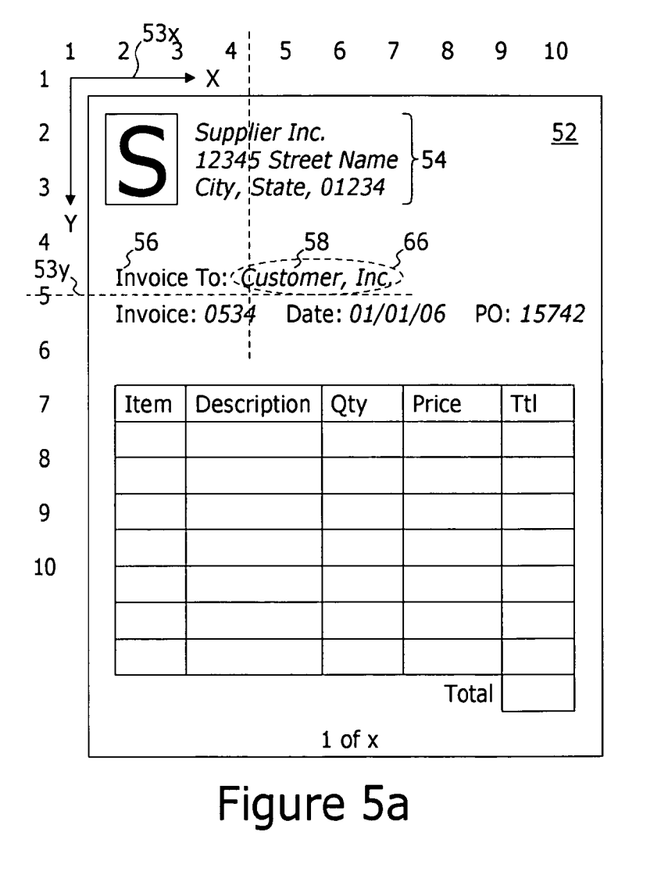
FIG. 5a is a graphic representation of an invoice document in accordance with an embodiment of the present invention.
Figure 6:
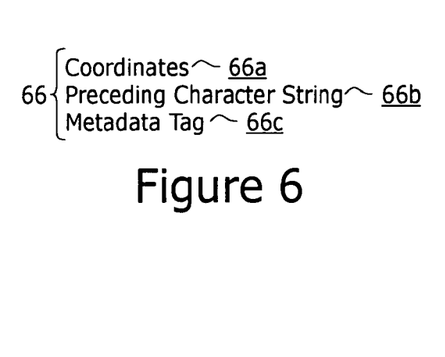
FIG. 6 is a diagram representing distinguishing field identification in accordance with an embodiment of the present invention.

Turning briefly to FIG. 5a wherein an invoice 52 is represented in graphic form, the distinguishing field identifier 66 may be a location on the document wherein customer identification text string 58 is located. Turning briefly of FIG. 6 in conjunction with FIG. 5a, the location 66 may be identified by: i) coordinates 66a such as horizontal 53x and vertical 53y coordinates from a fixed point such as the upper left corner of the document 52; ii) a preceding character string 66b such as a character string "Invoice To:" 56 which precedes the customer identification text 58; or iii) a metadata tag 66c which may be a hidden text tag that is not printed on a graphic representation of the invoice 52 but can be utilized for identifying the customer identification text string 58.

Figure 5B:
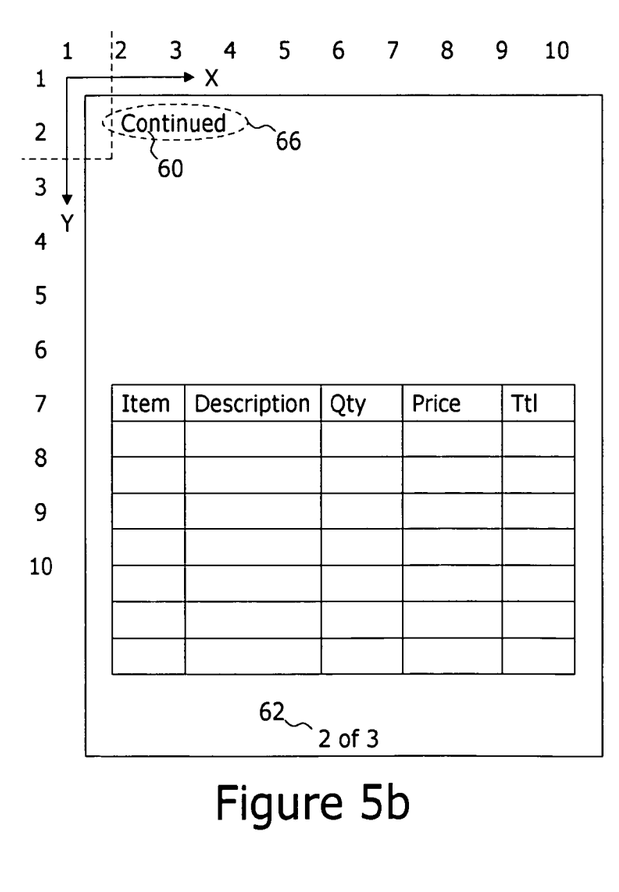
FIG. 5b is a graphic representation of an invoice document in accordance with an embodiment of the present invention.

Turning briefly to FIG. 5b, for purposes of invoices comprising multiple pages, the distinguishing field identifier 66 may also be a location on the document wherein additional page identification text 60 is located. This facilitates identifying a document 16 which is assigned to either the first set of documents 37a-37e or the second set of documents 38a-38e in conjunction with the preceding document 16 as opposed to an independent document.

Again, the distinguishing field identifier may be coordinates, a preceding character string, or a metadata data tag. Examples of additional page identification text include the text "continued" 60 or a page number identifier 62 wherein the page number is greater than 1, but less than or equal to the total number of pages (e.g. 2 of 3 or 3 of 3 for example).

Figure 7:
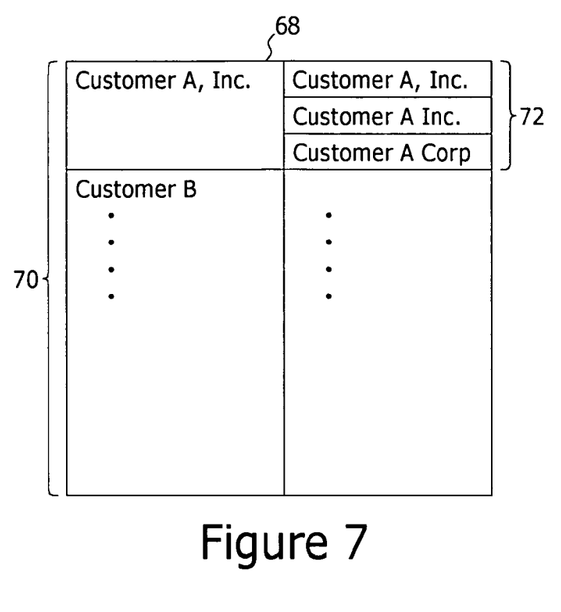
FIG. 7 is a diagram representing a group one database in accordance with an embodiment of the present invention.

Turning briefly to FIG. 7, an exemplary group 1 database 68 is shown. The group 1 database may comprise a plurality of records 70. Each record may identify the group 1 recipient identification string such as the company name of a customer that utilizes the automated data processing system 28 such that invoices directed to such customers are part of the first set of documents 37a-37e.

Because customers register with the automated data processing system 28, it is possible that the syntax of the customer's name as input by the customer to the automated data processing system 28 does not exactly match the syntax of the customer's name as input by the invoicer into its accounting system 10. As such, associated with each record 70 may be a plurality of identifiers 72, each of which is an alternative syntax of the customer's name. In operation, the application may utilizes the identifiers 72 as the group 1 recipient identification strings for determining whether an invoice is part of the first set of documents 37a-37e.

Figure 9:
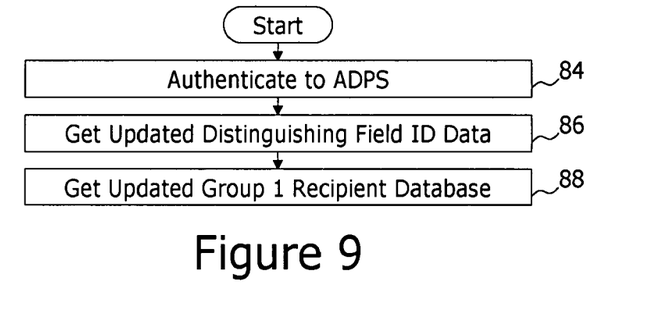
FIG. 9 is a flow chart representing an aspect of operation of a print processor in accordance with an embodiment of the present invention.

The flow chart of FIG. 9 represents exemplary operation of an aspect of the application 46 wherein the application 46 obtains from the automated data processing system, both the distinguishing field identifier 66 and the data for populating the group 1 database 68. In more detail, with reference to FIG. 9 in conjunction with FIG. 4, step 84 represents the application 46 authenticating to, and establishing a session with the automated data processing system 28. Step 86 represents the application 46 obtaining updated distinguishing field identifier data and step 889 represents the application 46 obtaining updated group 1 database data.

It should be appreciated that as additional customers commence use of the automated data processing system 28 for receiving invoice data (or customers discontinue use of the automated data processing system 28), the records 70 and identifiers 72 (FIG. 6) of the group 1 database 68 will require updating.

Further, in the event that the accounting system (or other print job source 10) is modified such that the document format is modified, the distinguishing field ID 66 may require modification.

As such, the application 46 may periodically executes the steps of the flow chart of FIG. 9 for purposes of updating the group 1 database 68 and the distinguishing field identifier 66.

Figure 10:
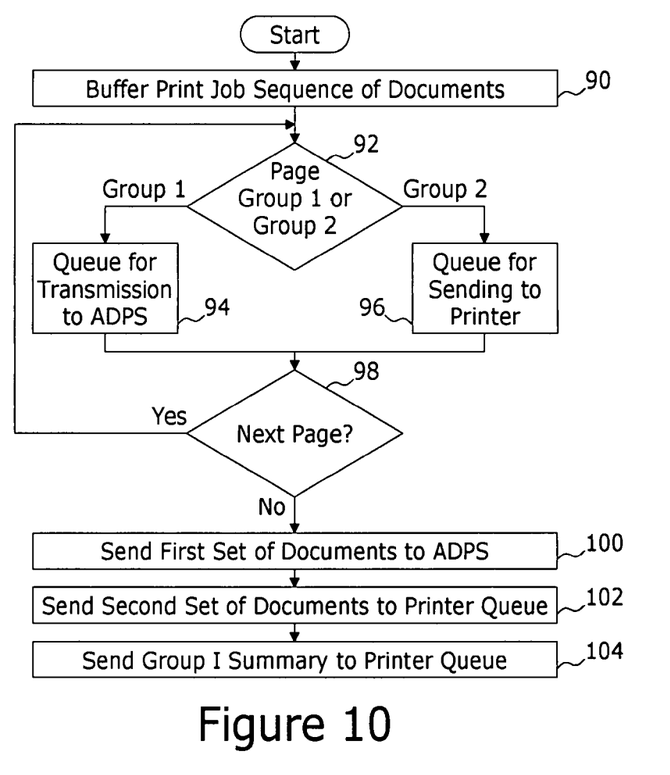
FIG. 10 is a flow chart representing an aspect of operation of a print processor in accordance with an embodiment of the present invention.

The flow chart of FIG. 10 represents exemplary operation of an aspect of the application 46 wherein the application 46 receives the sequence of documents 16a-16e and determines whether each document (e.g. each page) 16 of the sequence of documents 16a-16e is part of the first set of documents 37a-37e or the second set of documents 38a-38c. Referring to FIG. 10 in conjunction with FIG. 4, step 90 represents the application receiving the sequence of documents 16a-16e from the print job source 10 and buffering such sequence.

Step 92 represents, for each document, matching the text located at the distinguishing field identifier with the data of the group 1 database (e.g. the records 70 and identifier 72 of FIG. 6) to determine whether the document is assigned to the first set of documents 37a-37e or the second set of documents 38a-38c.

If the document is assigned to the first set of documents 37a-37e, the document is queued for transmission to the automated data processing system 28. If the document is assigned to the second set of documents 38a-38, the document is queued for sending to the printer 24 (e.g. for direction to the print driver spooler 18) at step 96.

Step 98 represents a determination of whether additional documents in the sequence of documents 16a-16e exist. If yes, step 92 is executed for the next document 16 in the sequence of documents 16a-16e.

Step 100 represents sending the first set of documents 37a-37e to the automated data processing system. As discussed, step 100 may comprise authenticating to, and establishing a secure session 14 with the automated data processing system and transferring the first set of documents 37a-37e in a secure manner.

Step 102 represents directing the second set of documents 38a-38c to the printer by directing the second set of documents 38a-38c to the printer queue 18 via the interface 34 therewith.

Step 104 represents generating the additional document 40 summarizing the documents assigned to the first set of documents 38a-38e and directing such additional document 40 to the printer 24.

It should also be appreciated that although the flow chart of FIG. 10 represents each step performed in a linear manner, for larger sequences of documents 16a-16e, all steps may be in process simultaneously. For example, the application 46 may commence the transfer of documents to the remote automated data processing system 28 and to the print driver spooler 18 while documents are still being received from the print job source 10. Such simultaneous operation reduces the size of a buffer that would be required for storing documents.

SUMMARY

In summary, the present invention provides for each document of a sequence of documents generated by a print job source to be automatically directed to an automated data processing system or a printer based on distinguishing characteristics.

Accordingly document data may be transferred from an accounting system to an automated data processing system, such as an invoice exchange system, simply by installing a virtual print drive in a system printer folder as opposed to traditional development of loaders and extractors.

Further, the text based data of the paper/printer description language output by the accounting system can be transferred directly to another accounting system without the inaccuracies of character recognition systems.

Although the invention has been shown and described with respect to certain preferred embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of system of the present invention. The present invention includes all such equivalents and modifications, and is limited only by the scope of the following claims.

What is claimed is:

1. A print processor for interfacing with a remote automated data processing system, the print processor comprising a processor executing code comprising:
   a print job source interface for receiving a sequence of documents from a print job source, the sequence of documents comprising a first set of documents and a second set of documents, the first set of documents and the second set of documents being mutually exclusive:
      each document of the first set of documents comprising data content to be directed to the remote automated data processing system; and
      each document of the second set of documents to be directed to a printer;
   a document buffer for storing the sequence of documents from the print job source;
   a print processor application for:
      establishing a network session to the remote automated data processing system;
      authenticating to the remote automated data processing system; and
      directing the transfer of the entire sequence of documents from the print job source to the remote automated data processing system;
      receiving, from the remote automated data processing system, identification of those documents within the sequence of documents from the print job source which are of the second set of documents;
      directing only the second set of documents, as identified by the remote automated data processing system, from the document buffer to a printer and not directing the first set of documents, as identified by the remote automated data processing system, from the document buffer to the printer.

2. The print processor of claim 1, wherein the print processor application further directs a group one summary document to the printer, the group one summary document comprising an identification of each document of the first group that was transferred to the remote automated data processing system.

3. A print processor for interfacing with a remote automated data processing system, the print processor comprising a processor executing code comprising:
   a print job source interface for receiving a sequence of documents from a print job source;
   a print processor application configured to, for each document of the sequence of documents from the print job source:
      assign the document to a first set of documents if a text string at a predetermined location within the document matches one of a plurality of group one recipient identification text strings;
      assign the document to a second set of documents if the text string at the predetermined location within the document does not match one of the plurality of group one recipient identification text strings, the first set of documents and the second set of documents being mutually exclusive;
      establish a network session to the remote automated data processing system;
      authenticate to the remote automated data processing system; and
      direct only the first set of documents to the remote automated data processing system; and
      direct only the second set of documents to a printer and not directing the first set of documents to the printer.

4. The print processor of claim 3, wherein the print processor application further directs a group one summary document to the printer, the group one summary document comprising an identification of each document of the first group that was transferred to the remote automated data processing system.

5. The print processor of claim 3, wherein the print processor application further obtains, from the remote automated data processing system:
   identification of the predetermined location; and
   identification of the plurality of group one recipient identification text strings.

6. A method of operating a computer system for transferring a first portion of a sequence of documents from a print job source over a network to which the computer is coupled to a remote automated data processing system and transferring a second portion of the sequence of documents to a printer for printing of each document of the second portion of the sequence of documents, the first portion and the second portion being mutually exclusive, the method comprising:
   receiving the sequence of documents from the print job source, the sequence of documents comprising a combination of the first portion and the second portion;
   storing the sequence of documents from the print job source;
   establishing a network session to the remote automated data processing system;
   authenticating to the remote automated data processing system;
   through the network session:
      directing the transfer of the entire sequence of documents from the print job source to the remote automated data processing system; and
      receiving from the remote automated data processing system, identification of those documents within the second portion; and
   directing only those documents of the second portion, as identified by the remote automated data processing system, to the printer and not directing those documents of the first portion, as identified by the remote automated data processing system, to the printer.

7. The method of claim 6, further comprising generating a summary document identifying each document of the first portion and directing the summary document to the printer.

8. A method of operating a computer system for transferring a first portion of a sequence of documents from a print job source over a network to which the computer is coupled to a remote automated data processing system and transferring a second portion of the sequence of documents to a printer for printing of each document of the second portion of the sequence of documents, the first portion and the second portion being mutually exclusive, the method comprising:
   receiving the sequence of documents from the print job source, the sequence of documents comprising a combination of the first portion and the second portion;
   identifying a document as part of the first portion documents if a text string at a predetermined location within the document matches one of a plurality of group one recipient identification text strings;
   identifying a document as part of the second portion if the text string at the predetermined location within the document does not match one of the plurality of group one recipient identification text strings;
   directing only the documents of the first portion to the remote automated data processing system; and
   directing only the documents of the second portion to the printer and not directing the first portion to the printer.

9. The method of claim 8, further comprising generating a summary document identifying each document of the first portion and directing the summary document to the printer.

10. The method of claim 8, further comprising, obtaining from the remote automated data processing system:
- identification of the predetermined location; and
- identification of the plurality of group one recipient identification text strings.

11. A print processor for interfacing with a remote automated data processing system, the print processor comprising:
- a print job source interface for receiving a sequence of documents; and
- an automated data processing client configured to:
  - establish a network session with the remote automated data processing system;
  - transfer the sequence of documents from the print processor to the remote automated data processing system;
  - receive, from the remote automated data processing system, identities of documents within the sequence of documents that need to be sent to a printer to the exclusion of documents within the sequence of documents that will be further processed by the remote automated data processing system without needing to be sent to the printer;
  - directing only the documents identified by the remote automated data processing system as needing to be sent to the printer to the printer, and not directing to the printer the documents that will be further processed by the remote automated data processing system.

12. The print processor of claim 11, wherein the print processor application further directs a summary document to the printer, the summary document comprising an identification of each document that was transferred to the remote automated data processing system.

* * * * *